(No Model.) 4 Sheets—Sheet 1.
W. D. ANDREWS.
MEANS FOR PROCURING SUPPLIES OF WATER FROM TUBULAR WELLS.
No. 349,379. Patented Sept. 21, 1886.
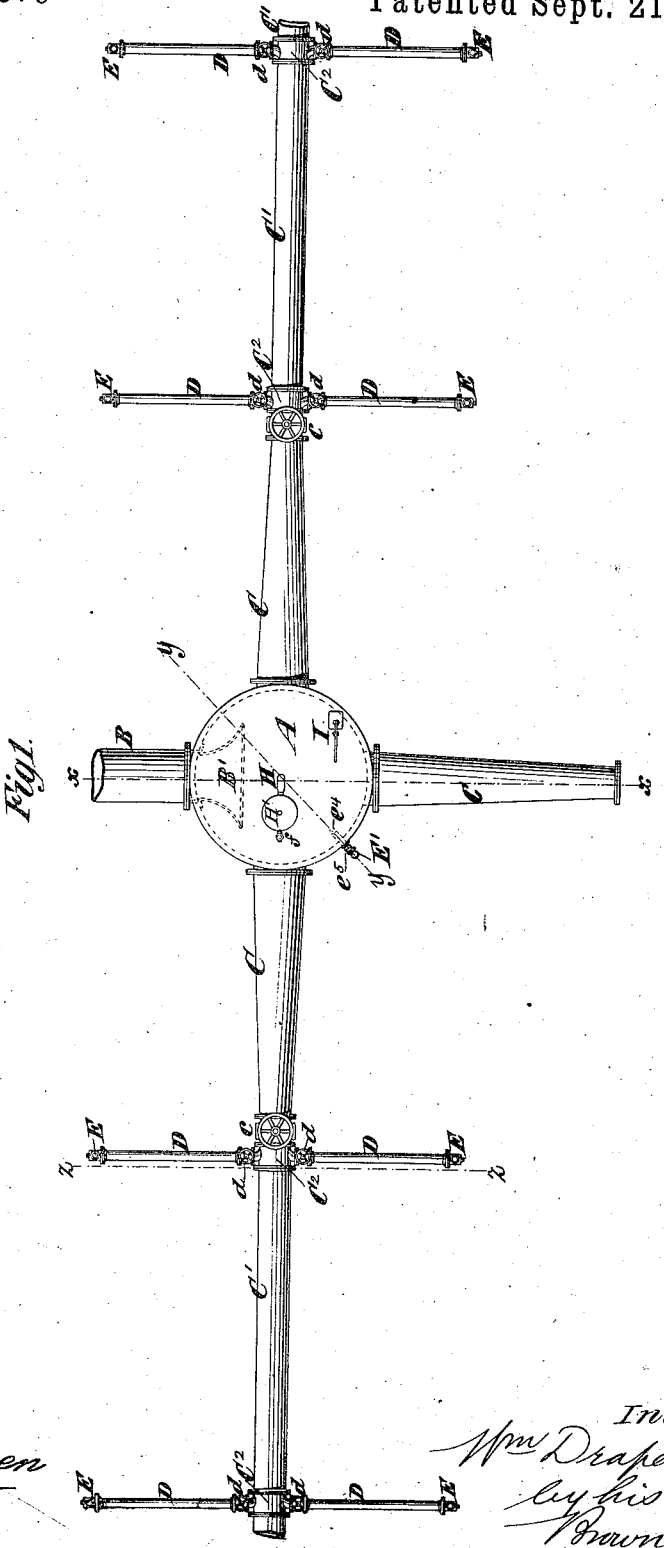
Witnesses:
Inventor:

(No Model.)  
4 Sheets—Sheet 2.
W. D. ANDREWS.
MEANS FOR PROCURING SUPPLIES OF WATER FROM TUBULAR WELLS.
No. 349,379. Patented Sept. 21, 1886.
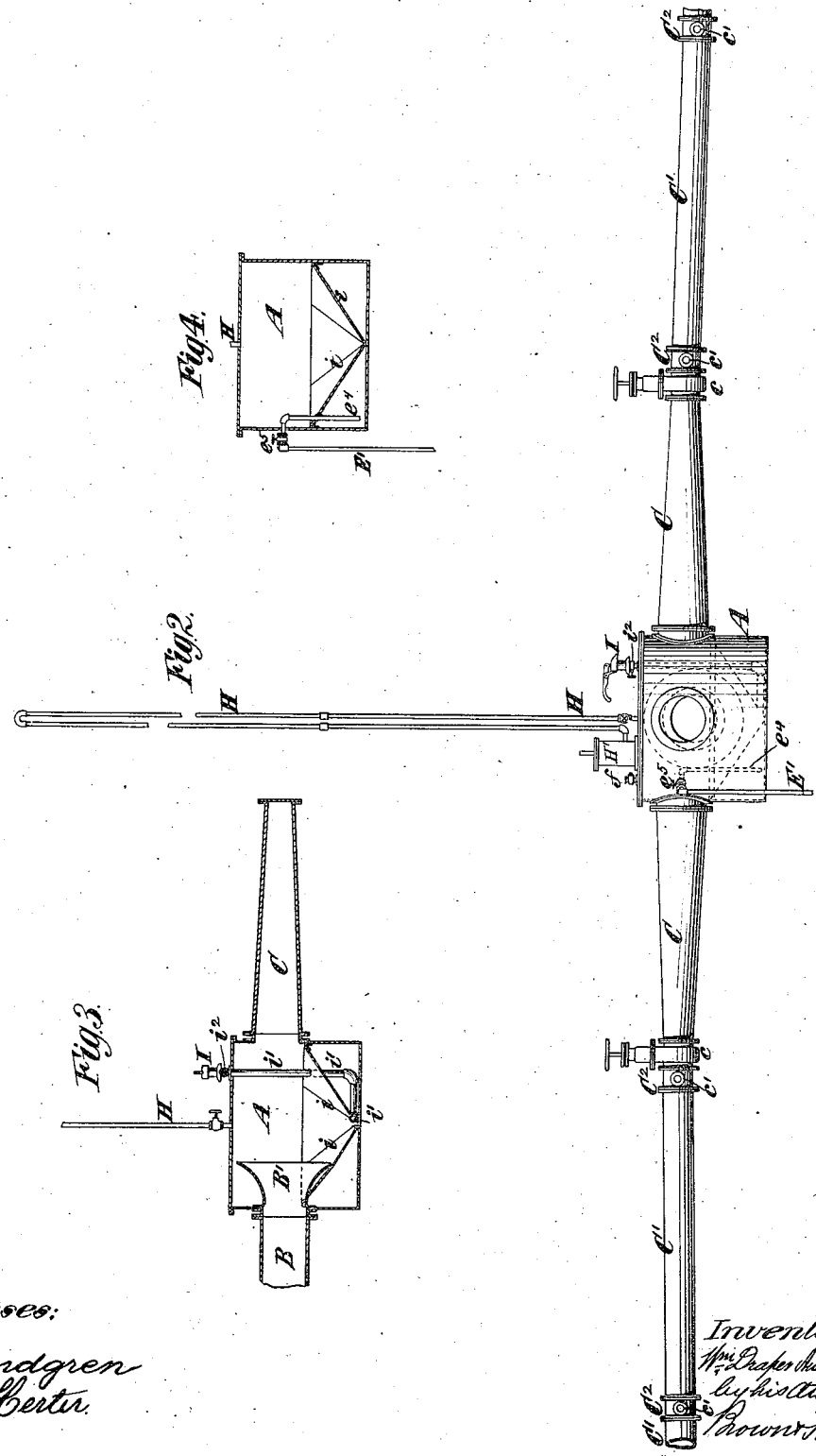
Witnesses:  
C. E. Sundgren  
Emil Herter
Inventor:  
W. Draper Andrews  
by his Attys  
Brown & Hall (No Model.) 4 Sheets—Sheet 3.
W. D. ANDREWS.
MEANS FOR PROCURING SUPPLIES OF WATER FROM TUBULAR WELLS.
No. 349,379. Patented Sept. 21, 1886.
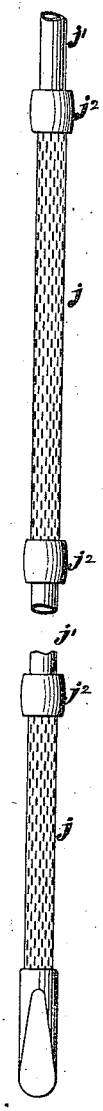

(No Model.)
W. D. ANDREWS.
MEANS FOR PROCURING SUPPLIES OF WATER FROM TUBULAR
No. 349,379. Patented Sept. 21, 18
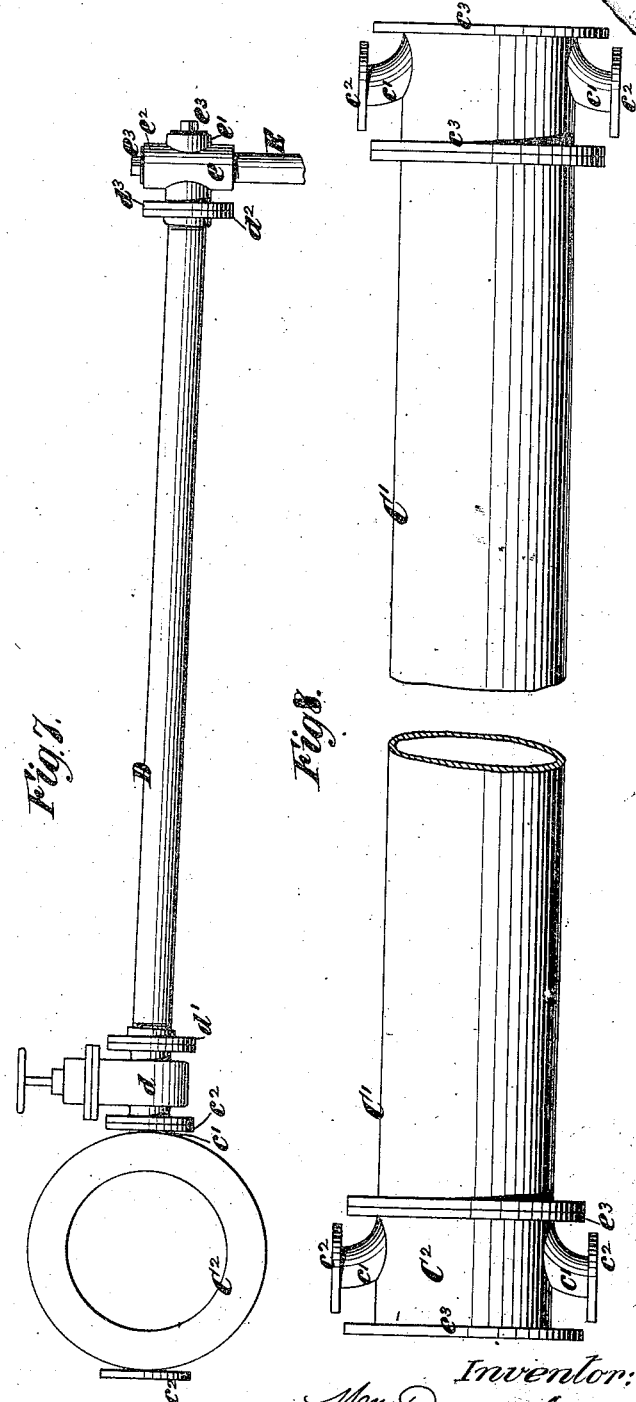
Witnesses:
C. E. Sundgren
Emil Koerter
Inventor:
Wm Draper Andrews
by his Attys
Brown & Hall

UNITED STATES PATENT OFFICE.

WILLIAM DRAPER ANDREWS, OF BROOKHAVEN, NEW YORK.

MEANS FOR PROCURING SUPPLIES OF WATER FROM TUBULAR WELLS.

SPECIFICATION forming part of Letters Patent No. 349,379, dated September 21, 1886.

Application filed April 20, 1886. Serial No. 199,557. (No model.)

*To all whom it may concern:*

Be it known that I, WILLIAM DRAPER ANDREWS, of the town of Brookhaven, in the county of Suffolk and State of New York, have invented a new and useful Improvement in Means for Procuring Supplies of Water from Tubular Wells, of which the following is a specification.

This invention relates to improvements in a plant of gang-wells, as originally patented by Jehyleman Shaw, under date of April 4, 1870; and the invention consists in novel combinations of parts and features of construction for an extended system of water-supply by the use of tube-wells inserted directly into the earth and remaining fixed therein.

In carrying out my invention I employ a central closed receiver, from which water is taken through a suction-pipe by any known form of pump, and which has extending or radiating from it one or more suction-mains, each main having at intervals in its length cross-pipes, whereby are connected with it tube-wells arranged at the side or sides of the main, and at a suitable distance therefrom and from each other, to secure the most copious supply of water.

The objects of my invention are to provide for the ready construction and connection of the several parts of the system, and also to provide for extending the system at any time at small additional cost; also, to provide for the ready ascent or discharge of all the air which may leak in through any of the tube-wells or connections into the central receiver, and for exhausting such air therefrom by means of a pump which may be operated continuously without drawing any water; also, to provide for the ready cleaning of the well-tubes and their cross-pipes whenever desired; also, to provide for the free return of water from the receiver and from the suction-mains and cross-pipes through the well-tubes to the earth, in case the pump shall be stopped for any reason, and to avoid liability of water freezing in the system when the pump is so stopped; also, to provide for a decreased velocity of the water in the suction-mains as it nears the central receiver, and the subsidence and collection in the receiver of all sand and grit which may be drawn up with the water, and the ready removal of such sand and grit at any time from the receiver; also, to provide for drawing water by means of a single well-tube from the several water-bearing strata through which the tubes may pass, and the water furnished by which is of proper quality, and for the exclusion from such well-tube of the water in any stratum through which the tube may pass, and in which the water is not of desired quality.

In the accompanying drawings, Figure 1 is a plan of a central receiver with suction-mains and cross-pipes connecting well-tubes with the mains. Fig. 2 is an elevation of the receiver and suction-mains. Fig. 3 is a sectional elevation of the receiver on the plane of the dotted line $x$ $x$, Fig. 1. Fig. 4 is a similar view of the receiver on the plane of the dotted line $y$ $y$, Fig. 1. Fig. 5 is a transverse section through one of the suction-mains on the plane of the dotted line $z$ $z$, Fig. 1, showing two well-tubes which embody my invention as connected therewith. Fig. 6 is an elevation, on a larger scale, of portions of one of these specially-constructed well-tubes. Fig. 7 is an elevation, upon a larger scale, of a portion of a suction-main and a well-tube connected therewith by a cross-pipe, and Fig. 8 is a plan of a portion of the suction-main on the same scale as Fig. 7, showing special sections thereof with which cross-pipes are to be connected.

Similar letters of reference designate corresponding parts in all the figures.

A designates a receiver, which may consist of a closed cylindric iron vessel or tank, preferably of a diameter at least equal to two or three times the combined diameter of the suction-mains attached to it, and having a depth at least two or three times the diameter of the largest pipe so attached. From this central receiver, A, extend or radiate one or more suction-mains. I have represented in Fig. 1 two of such mains extending at diametrically-opposite points and at right angles to the suction-pipe B, with which any known form of pump may be connected for withdrawing water from the receiver. I have also shown a portion of another main extending from the receiver at a point opposite the suction-pipe B. These mains each comprise sections C C' C², and with the section C² are connected cross-pipes D, each leading from the head of a well-tube or drive-well, E. The final section C of the main, which is connected directly with the receiver, consists of a flanged pipe, which may have a length about nine times the inner diameter of the principal portion of the main, and which is of a gradually-increasing diameter from its outermost end toward the receiver. The inner diameter of the larger end of the section C which attaches to the receiver may be proportioned as about eighteen to ten to the inner diameter of its smaller end, which is of the same diameter as the principal portion of the suction-main. These expanding or taper main sections C have horizontal axes which are at right angles to the perpendicular sides of the receiver. Freeway gate-valves $c$ are attached to the outer smaller ends of the taper sections C, and to these valves are attached the general suction-mains, each of which consists of alternate long plain sections C', and short sections, or, as I term them, "special sections," $C^2$, of flanged pipe. Each of the long plain sections C' may be composed of one or more lengths of flanged pipe, according to the distance desired between two special sections $C^2$. The construction of these special sections $C^2$ will be best understood from Figs. 7 and 8. They each have branches or bends $c'$ upon their opposite horizontal sides, which are curved forward toward the receiver, and the inner areas of which are at least equal to that of their connecting cross-pipes D. The curved lateral branches $c'$ have perpendicular flanges $c^2$ at their outer ends, and to each flange is attached, at right angles to the suction-main, a freeway or gate-valve, $d$, and to that, by an oblique flange, $d'$, a cross suction-pipe, D, which extends, by reason of the oblique flange $d'$, at a downward incline to and is connected by another oblique flange, $d^2$, with a right-angle flange, $d^3$, upon the well-head $e$, which is attached to the upper end of the well-tube E, usually by a screw-threaded joint. The cross-pipes D usually have an area at least double that of the well or wells E connected with them. The well-head $e$, as shown in Fig. 7, is made in the form of a cross-fitting, having sockets $e'$ $e^2$, which are in line, respectively, with the cross-pipe and the well-tube E, and which are closed by plugs $e^3$. By removing these plugs an implement may be introduced in through the cross-pipe D or the well-tube E, for cleaning it, and, if desired, another cross-pipe, or an extension connected with another well or wells, may be inserted into the socket $e'$, which is opposite the end of the cross-pipe D, thereby providing for the extension of the system.

The special sections or short sections $C^2$ of the main, with their side branches, $c'$, are only as long longitudinally between the faces of their end flanges, $c^3$, as will leave these flanges an inch in the clear of the outside diameter of the side flanges, $c^2$, and these end flanges, $c^3$, are made of such diameter as to leave the inner surface of the side flanges, $c^2$, beyond the line of extreme diameter of the main flanges $c^3$. These shapes and proportions insure easy, cheap, and accurate fitting, ready access to bolts and nuts, and permit the turning of the faces and edges of all the flanges on a lathe, with moderate swing and of but two adjustments. The long sections C' of the suction-mains are made of such length as will place the wells E at a suitable distance apart longitudinally of the mains, according to the nature of the soil, and preferably they are placed on lines parallel with and on the sides of the suction-mains, their distances usually being the same in a direction transverse to the mains as in a direction parallel with the main.

From the receiver beyond the expanded sections C the mains are continued throughout of the same diameter as the smaller ends of the expanded sections C, notwithstanding that as the distance from the receiver increases less water passes through them. This equalizes the delivery from the wells at different distances from the pump, and the increased amount of material is also compensated for by the decreased friction of the water, the saving of labor, and the convenience for connecting and transposing or adding additional wells for extension of the line to increase the supply.

Starting from the wells E, the cross-pipes D have each a rise of about one to three inches in their length toward the suction-main, and the suction-mains each have a slight rise through their entire length toward the receiver, which may be usually an inch (more or less) in every twenty-five to forty feet. This rise in the mains toward the receiver may be secured while using right-angle flanges by the elasticity of the rubber gaskets, or by inserting a gasket of the proper taper thickness in the first joint at the valve $c$, and thereby any required degree of ascent toward the receiver may be obtained. This arrangement or rise of all the lateral pipes of the system toward the receiver insures the escape through the cross-pipes and mains to the receiver of any air that may enter by any possible leaks in the wells or connections, whence it is removed by the air-pump, as I shall soon describe.

In order to avoid freezing in severe weather, if the operation of the pump be stopped for the purpose of examination or making any necessary repairs, I provide for emptying the pipes of the system, except a small quantity, of water, which may remain in the receiver and at the extreme outer ends of the suction-mains below the cross-pipe openings, by opening the air-cock $f$, which is provided on the receiver. This cock being opened to admit air, the water in the suction-mains and cross-pipes D will flow downward, owing to the slight inclination of the mains and pipes, and be returned to the wells.

The water which is in the extreme outer ends of the suction-mains may be discharged from the mains by a cock provided at the outer and lower end of each main. The water remaining in the receiver below the openings of the suction-mains thereinto may be drawn off by admitting air on the surface of the water from the air-cock $f$, and the use of a special siphon-well, E', which is shown in Figs. 2 and 4, and the shorter leg, $e^4$, of which extends downward into the receiver near to the bottom thereof. This well is provided with a stop-valve, $e^5$, just outside the receiver. By means of the valves $d$ in the cross-pipes D any one or any number of the well-tubes E may be cut off from communication with the suction-mains without stopping the pump, and the valves $c$ in the suction-mains near the receiver A provide for cutting off any section with all its well-tubes without stopping the pump, and without interfering with the operation of the remainder of the system.

As I have before described, any air which may leak into the system will, by reason of the ascent of all the pipes toward the receiver A, be discharged thereinto, and to provide for removing the air from the receiver and maintaining a partial vacuum therein I employ a pipe, H, extending upward from the receiver to a height beyond that to which the atmosphere will force water; or, in other words, beyond thirty-three or thirty-four feet, and which is connected with a vacuum-pump or air-pump, H', which may be of any suitable character. Owing to the height of the pipe H, the pump H' may be operated continuously to keep the receiver free of air, and will never pump water. The operation of the air-pump H' will remove either the entire pressure of the atmosphere from the surface of the water in the receiver, or such proportion thereof as may be desired.

The expanding or taper sections C of the suction-mains are important, as by them the delivery of water is greatly increased, while its velocity in passing through them, just before entering the receiver, is reduced over one-half, and the remaining velocity is again reduced one-half in passing through the receiver to the suction-pipe B, leaving then but one-quarter the initial velocity of the water. By thus reducing the velocity of the water its capacity to carry sand or sediment heavier than water is reduced at the ratio of the square of the velocity, or to one-sixteenth.

In case any sand or sediment should enter the well, through any possible defect of the tubes or strainers, and be carried forward in suspension by the velocity of the water, when it enters the expanding sections C, its subsidence will commence and go on at a rapidly-increasing ratio in the sections C and the receiver, which insures the deposit of sand and sediment in the bottom of the receiver at its center, all that settles on the bottom of the expanding pipes or sections C being washed down their inwardly-inclined bottom surface into the receiver by the reduced current of water.

Within the receiver is a false bottom of metal, which is inclined downward from all sides toward the center of the receiver. This false bottom $i$ may be made in sections, so as to admit of its ready removal and replacement. The sand and sediment entering the receiver will wash down the steep incline of the false bottom by gravity to its center, and may at any time be removed by the sand-pump I, having a suction-pipe, $i'$, leading to the center of the false bottom. The suction-pipe $i'$, leading to the sand-pump I, may be provided with a stop-valve, $i^2$, below the pump, as shown in Fig. 2.

To still further increase the delivery of water through the suction-pipe B without an increase of power, I insert within the receiver A and at the mouth of the pump suction-pipe an enlarged mouth-piece, B', approaching as nearly as may be to the form of a vena contracta, having the diameter of its smallest end the same as the pump suction-pipe B, to which it is attached, and that of its larger end about as twenty to nine of the diameter of the smaller end, its length being about as eight to nine of that diameter. The longitudinal convex inner sides of this mouth-piece B' are formed on lines corresponding to the segments of a circle of radius equal to its smallest diameter.

I will now describe that part of my invention which relates to the construction of the well-tubes E, and which is illustrated in Figs. 5 and 6. In the usual method of making a tube-well it is customary to admit water only through a strainer-point at or near the bottom end and to draw water only from a single stratum; but wherever pipe-wells are practicable it is usual to find two, three, or more strata of water-bearing earth, sand, or gravel at various distances from the surface, sometimes as low as two hundred or more feet, the different strata being practically disconnected from each other by intermediate strata of extremely-fine sand, quicksand, hard-pan, clay, or other material nearly or quite impervious to water. The water in these different strata frequently varies in quality, but ordinarily two, and sometimes all, of the different strata yield water of a satisfactory quality, the water from each usually rising in the wells to a level with the surface-water, and frequently from the lower strata, considerably above that level, and at times above the earth's surface sufficient to cause a continuous flow.

It is impracticable to admit water into the well-tube throughout its entire length beneath the surface of the water, both on account of its varying quality, and for the reason of the occurrence, as stated, of very fine sand and earth, quicksand, soft clay, &c., in the intermediate strata, as these materials will pass the finest strainers and destroy the limpidity of the water. It would also increase the first cost of putting down, and danger of breakage and injury in doing it.

By my improved system, after ascertaining by any of the well-known methods—as, for example, by a trial-well—the depths and thicknesses of the water-bearing strata and the quality of water in each, either an open tube with a strainer attached to its lower end, or a strainer-point, with or without an extension-strainer attached, is connected with such lengths of tubing as will reach from the lower stratum selected to the next available stratum above it. An extension-strainer (a section of strainer similar to that which forms a portion of the point) of a greater or less length—say from two to four feet (more or less)—as the thickness and nature of the strata indicate to be most desirable, is then attached, and to it, in proper lengths, as convenient, enough plain pipe to reach from that second stratum to the next available one above, if there be three or more strata desirable to utilize. The pipe is then sunk to the proper distance and position, and when other sections of the strainer-extensions are required they are added, with sufficient plain pipe to reach the next water-bearing stratum above, or to finish the well, as the case may be. The well so formed is sunk to a proper depth to place the several strainer-sections in proper connection with the desired water-bearing strata, and the plain pipe is extended to the desired point to connect with the suction-pipe leading to the pump. The points, strainers, extensions, and plain pipe are coupled together by screw-threaded joints.

In Figs. 5 and 6, $j$ designates the several strainer-sections for drawing water from the different strata, and $j'$ designates the sections of plain pipe which are introduced between the strainer-sections. In Fig. 6, $j^2$ designates the couplings whereby the strainer-sections $j$ and the plain pipe-sections $j'$, which are imperforate, are coupled together.

The underground, over, and underlying water-bearing strata in the same locality frequently extend to long distances without communicating with each other, and often receive their supplies from widely-separated localities. This is shown by the chemical variations and difference in temperature of water from strata separated by only a few feet of clay or other soil. Where two or more separate water-bearing strata exist, the amount of water obtainable from a given area is usually largely increased and the labor of the pumps decreased by the easier and more abundant flow secured by opening connections from the several strata with each well.

I do not claim, broadly, herein the combination, with a vessel or casing to receive liquid, and from which air is to be exhausted, of an air-pump connected therewith by a pipe which extends from the vessel or casing upward beyond the limit of atmospheric pressure to raise said liquid, as such a combination forms the subject of my pending application, Serial No. 204,451, June 8, 1886.

What I claim as my invention, and desire to secure by Letters Patent, is—

1. The special section for the suction-main, consisting of a short section of pipe having flanges at opposite ends, and branches curving from its opposite sides and provided with flanges, substantially as herein described.

2. The special section $C^2$, for the suction-main, consisting of a short section of pipe having flanges $c^3$ at opposite ends, and having curved lateral branches $c'$ on opposite sides, also provided with flanges $c^2$, each pair of flanges $c^3$ and $c^2$ having their faces exposed beyond the peripheries of the flanges of the other pair, substantially as herein described.

3. A suction-main composed of alternate long sections of plain flanged pipe and intervening special sections, each consisting of a short section of pipe provided at the ends with flanges, and also having at opposite sides curved lateral branches, also provided with flanges, substantially as herein described.

4. The combination, with a main composed of long sections of plain flanged pipe, and special sections, each consisting of a short section of flanged pipe having at opposite sides curved lateral branches provided with flanges, of straight-way valves secured to said lateral branches, and cross-pipes extending from the valves and connected with well-tubes, substantially as herein described.

5. The combination, with a suction-main and well-tubes at the side or sides thereof, of cross-pipes connecting the well-tubes with the main, and having a slight rise or upward inclination from the well-tubes toward the main, substantially as and for the purpose herein described.

6. The combination, with a receiver and a series of well-tubes, of a suction-main through which water from the several well-tubes is conducted to the receiver, and which has a slight rise or upward inclination from the outer end toward the receiver, substantially as and for the purpose herein described.

7. The combination, with a receiver, of a system of well-tubes connected therewith by laterally-extending pipes, all of which have a slight rise toward the receiver to insure the passage of all air from the well-tubes and connecting-pipes to the receiver, substantially as herein described.

8. The combination, with a receiver and a series of well-tubes, of a suction-main connecting the well-tubes with the receiver, and comprising at the receiver a final section which expands or is of a gradually-increasing diameter toward the receiver, substantially as herein described.

9. The combination, with a receiver and a series of well-tubes, of a suction-main, whereby the well-tubes are connected with the receiver, and which comprises at the receiver a final section which expands or gradually increases in diameter toward the receiver, and a valve at the smaller end of said final section of the main, substantially as herein described.

10. The combination, with a receiver and a suction-main leading thereto, and comprising at the receiver a final section which expands or is of increasing diameter toward the main, of a valve at the smaller end of said final section, well-tubes arranged at the side or sides of the main, and cross-pipes connecting the well-tubes with the main and provided at the main each with a valve, substantially as herein described.

11. The combination, with a receiver and a system of well-tubes connected therewith, of an inclined false bottom in the receiver, and a sand-pump for withdrawing sand from above the false bottom, substantially as herein described.

12. The combination, with a receiver having a false bottom, of a system of well-tubes and a suction-main with which the well-tubes are connected, and which is joined to the receiver above the false bottom by a final section which expands or increases in diameter toward the receiver, substantially as herein described.

13. The combination, with a well-tube and a cross-pipe through which water is delivered therefrom, of a cross-fitting having upright and lateral branches, with two of which are connected the well-tube and cross-pipe, and the other two of which are fitted with removable plugs, whereby provision is afforded for cleaning the well-tube and cross-pipe, substantially as herein described.

14. The combination, in a well-tube, of alternate sections of plain pipe, with sections of strainer-pipe, in the proportions and for the purpose substantially as herein described.

15. The combination, with a receiver and a system of well-tubes, of a suction-main, with which are connected the well-tubes, and which has a slight upward rise toward the receiver, and comprises at the receiver a final section which expands or is of increasing diameter toward the receiver, and the bottom of which is inclined downward to the receiver, substantially as herein described.

16. The combination, with a closed receiver, of a suction-main, with which are connected a series of well-tubes, and by which the water from said well-tubes is delivered to the receiver, and an air-inlet cock on the receiver, which, when opened, allows air to enter and the water to fall in the main and series of well-tubes, substantially as herein described.

17. The combination, with a closed receiver provided with an air-inlet cock, and a system of well-tubes connected therewith, of a separate well-tube communicating with the receiver and terminating as a siphon therein, whereby water will be removed from the receiver when the air-cock is opened, substantially as herein described.

18. The combination, with a receiver and a system of well-tubes connected therewith, of a suction-pipe by which a pump may be connected with the receiver, and which has at its inlet end within the receiver a vena contracta or bell-mouth, substantially as herein described.

19. The combination, with a closed receiver and a system of well-tubes connected therewith, of a vacuum-pump or air-pump, and a pipe extending upward from the receiver beyond the limit of atmospheric pressure, to raise water, and through which said pump may withdraw air from the receiver, substanially as herein described.

20. The combination, with a closed receiver and a system of well-tubes connected therewith by cross-pipes, and mains having a slight rise or upward inclination toward the receiver, of an air-pump or vacuum-pump connected with the receiver by a pipe which extends upward from the receiver beyond the limit of atmospheric pressure, to raise water, substantially as herein described.

WILLIAM DRAPER ANDREWS.

Witnesses:
PETER C. JACOBSON,
C. HALL.